May 5, 1959 R. C. FISHER 2,885,356
SEPARATION OF COMPONENTS FROM A FLUID MIXTURE
Filed Feb. 1, 1954 3 Sheets-Sheet 1

Inventor:
Raoul Conrad Fisher
by:
Morgan, Finnegan, Durham & Pine
Attorneys

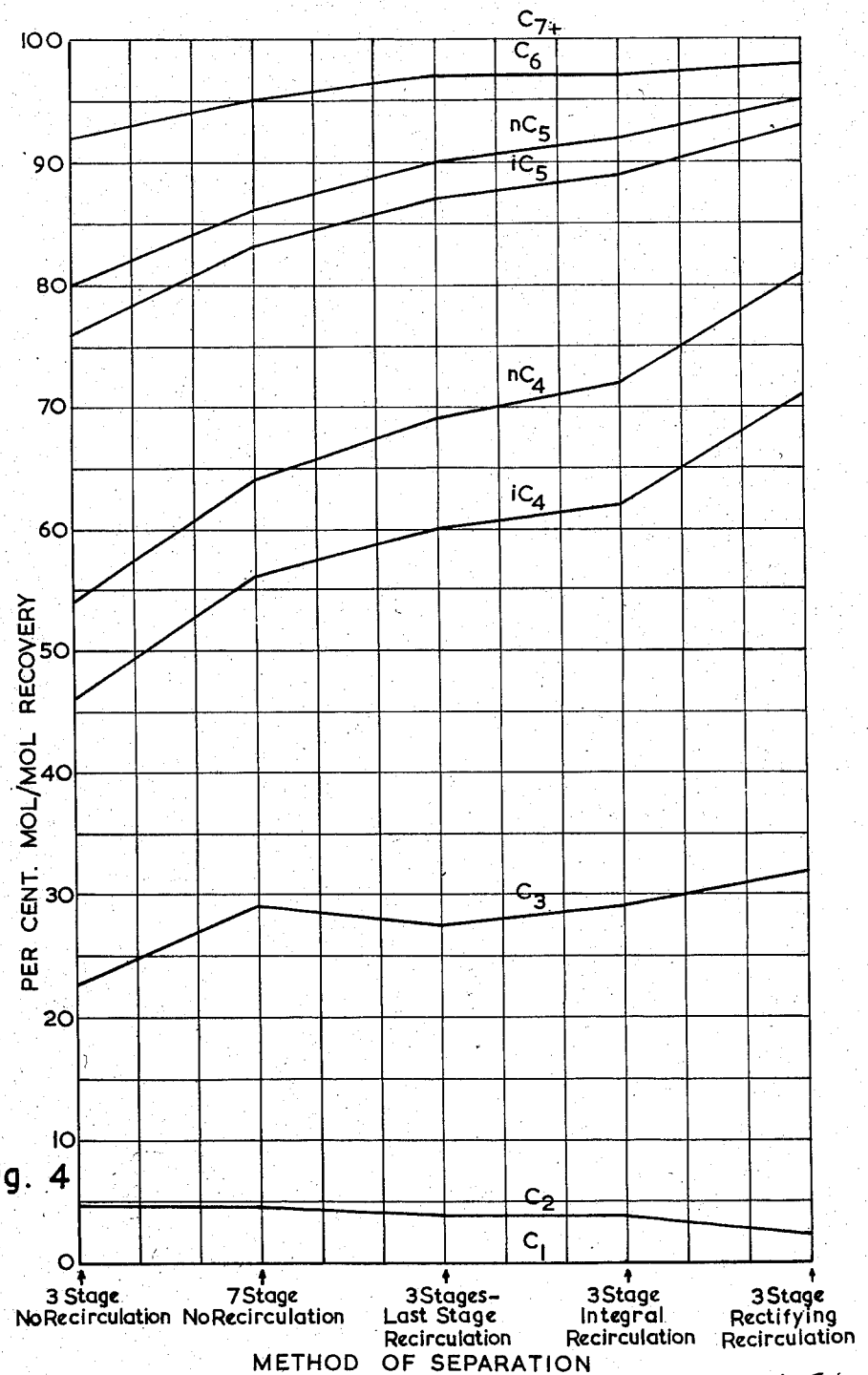

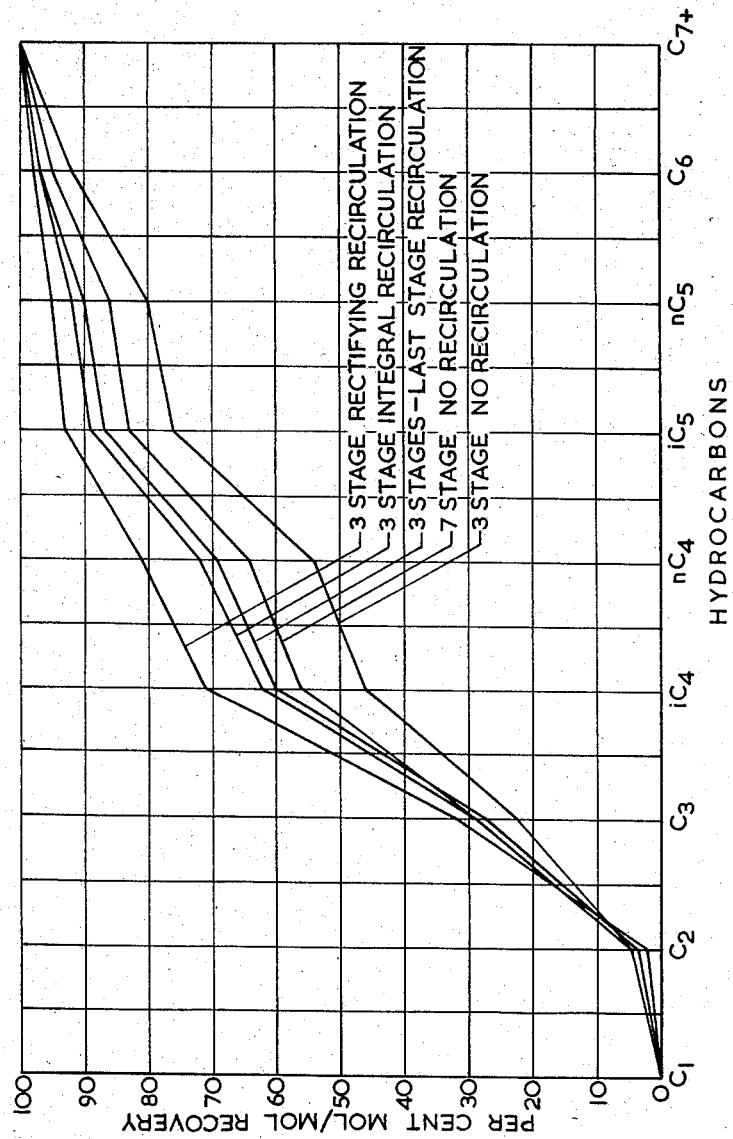

2,885,356

SEPARATION OF COMPONENTS FROM A FLUID MIXTURE

Raoul Conrad Fisher, London, England, assignor to Head Wrightson Processes Limited, London England, a British company Application February 1, 1954, Serial No. 407,558

3 Claims. (Cl. 208—361)

The invention relates to a process for the separation of components of different volatility from a fluid mixture.

It is known to separate components from a fluid mixture by fractional distillation or rectification. In such a process, part of the fluid mixture in the vapor phase is brought into continuous countercurrent contact with part of the fluid mixture in the liquid phase, in a fractionating or rectifying column. Condensation and vaporization take place throughout the column and the rising stream of vapor becomes enriched in the more volatile component or components. A temperature gradient exists in the column whilst the pressure is substantially constant throughout the column; for this reason, such a process of rectification or fractionation may be described as isobaric rectification.

It is an important feature of isobaric rectification that part of the vapor withdrawn from the column is returned to the upper part of the column as liquid reflux. This liquid reflux plays an important part in the separation of the components of the mixture.

According to the invention, the separation of a component or of components from a fluid mixture comprising a liquid and a gas is effected by decreasing the pressure on the mixture in three or more stages, separating gas from the liquid in each of the stages and recycling the separated gas from at least one stage, into the fluid mixture prior to entry of the mixture into a stage operating at a higher pressure than the pressure of the stage from which the recycled gas is drawn.

The term "gas" is to be understood as a substance or a mixture of substances which are in the gaseous phase under the conditions prevailing at the time, and liquids are similarly defined.

Intimate contact is provided between the liquid and gaseous components of the fluid mixture. Each stage is provided with a vessel in which separation of the liquid and gaseous phases can take place. The recycled gas is brought substantially into equilibrium with the fluid mixture into which it is introduced, before the mixture enters the separation vessel of the stage immediately after the position of introduction of the recycled gas. Advantage may be taken of the quick attainment of equilibrium between the gaseous and liquid phases, particularly between hydrocarbon gases and oils, under turbulent flow conditions, which results in a minimum of time for the near approach to equilibrium.

In a preferred manner of carrying the invention into effect, gas released in each stage after the first stage is compressed to the pressure used in the stage immediately preceding the stage from which the gas was withdrawn and is recycled to the fluid mixture prior to its entry into that immediately preceding. This particular method of carrying out the invention is identified in the specification by the term "rectifying recirculation."

The temperature of the fluid mixture may be at substantially the same level in each of the stages or it may differ and/or vary in one or more of the stages. Thus, for example, the temperature of the fluid mixture may be allowed to drop as heat is removed by the evolution of gas upon reduction or pressure, or it may be maintained constant by heating the fluid mixture, or it may be increased as the mixture flows through one or more of the stages of the system.

The pressures used will depend largely on the nature of the fluid mixture and on the component or components which are to be separated. Thus the pressure in one or more of the stages may be greater than or less than atmospheric pressure. In the treatment of a crude petroleum for example, the last stage may be operated at any pressure below atmospheric to produce a crude the total vapor pressure of which is less than atmospheric. A weathered crude may thus be produced by the simplest means.

The invention provides a process the results of which are analogous to those obtained by thermal or isobaric rectification and where the temperature of the fluid mixture is substantially at the same level in the several stages, the process of the invention may be identified by the term "Isothermal rectification." The decreasing pressure on the fluid mixture may be compared with the increasing temperature to which the liquid is subjected in isobaric rectification, whilst the return of the gas to an earlier stage and the act of bringing it substantially into equilibrium with the liquid in an earlier stage may be compared with the purpose and act of returning the liquid as reflux in thermal or isobaric rectification.

The invention may be carried into effect in many ways. Thus the pressure on the fluid mixture may be let down in three stages and the gas released from the last stage may be recycled into the fluid mixture at a position between the first and second stage, whilst the gas released in the second stage may be recycled into the fluid mixture prior to its entry into the first or high pressure stage, the gas released from the first stage being allowed to escape from the system. Such a method of separation is an example of rectifying recirculation. The gas released from the second stage may, however, be released from the system instead of being recycled as described above.

In a further method of carrying the invention into effect with the use of a 4-stage system, the gas released from the mixture in the fourth or last stage may be compressed to the pressure prevailing in the third stage and may be mixed with the major feed to the third stage.

Similarly, the gas released in the third stage may be compressed to the pressure maintained in the second stage for introduction into the major feed to the second stage. The major feed to the second stage passes from the first stage of the system. The gas released in the second stage might be compressed to the pressure maintained in the first stage and be mixed with the major feed to the first stage. The major feed to the first stage constitutes the feed to the plant or system. The gas released in the first stage is withdrawn from the system. Such a method constitutes a further example of rectifying recirculation.

It may be in some cases desirable for economic reasons to accept a somewhat lower recovery than that which may be achieved in the 4-stage rectifying recirculation system described above, by allowing to escape from the system not only the gas leaving the first or high pressure stage, but also the gas leaving the second stage. Only the gas from the third and fourth stages would be then recycled in the manner described.

The recycled gas is advantageously intimately mixed with the liquid mixture into which it is recycled, and the period and degree of mixture should be sufficient to permit the liquid mixture and the recycled gas to attain a substantial degree of equilibrium before the resulting mixture passes into the vessel in which separation of the liquid and gaseous phases at that particular stage is effected.

The pressure in the final stage of the separation may be maintained at the pressure at which it is desired the liquid phase product to be stable. This discharge pressure will generally be atmospheric, but need not necessarily be so.

The process of the invention may be applied with particular advantage to the separation of gas from crude oil, in which separation it is generally desirable to separate the hydrocarbons containing up to 4 carbon atoms whilst reducing to a minimum the loss of higher hydrocarbons.

In one specific example of carrying the invention into effect, gaseous hydrocarbons were separated from crude oil at a pressure of 30 atmospheres absolute into a pressure let-down unit. In the unit, the pressure was reduced in three stages whilst the temperature was maintained at substantially the same level in each of the three stages of the unit. The separation of the gaseous and liquid phases in each of the three stages was effected in a tank-like vessel or separator, the feed line to each separator being provided with a pressure reducing valve. The pressure was maintained at 25 atmospheres absolute in the first stage, at 5 atmospheres absolute in the second stage, and at about atmospheric pressure in the third stage.

The gas released in the third stage was compressed to 5 atmospheres absolute and recycled to the feed to the second stage, whilst the gas released in the second stage was compressed to 25 atmospheres absolute and recycled to the feed to the first stage. The gas released in the first stage was discharged from the unit.

The liquid phase from the first stage, after passage through the pressure reducing valve and after admixture with the gas recycled from the third stage, constitutes the feed to the second stage; the liquid phase from the second stage forms the feed to the third stage, whilst the liquid phase separated in the third stage is withdrawn from the unit.

An adequate length of pipe-line was provided between the separator and the position of entry of the recycled gas to ensure that equilibrium between the recycled gas and the liquid phase was substantially attained before the mixture passed into the separator.

In the accompanying drawings, the invention is illustrated by way of example and the degree of separation and the liquid phase recovery of a mixture of hydrocarbons obtained by the process according to the invention is compared with the degree of separation and liquid phase recovery obtained by other processes.

Figure 4 is a graph showing the percentage recovery of hydrocarbons in the liquid phase obtained by methods according to the invention and by other methods; and, Figure 5 gives the results shown in Figure 4 in another form, the percentage recovery in the liquid phase being plotted against the hydrocarbons.

Figure 1:
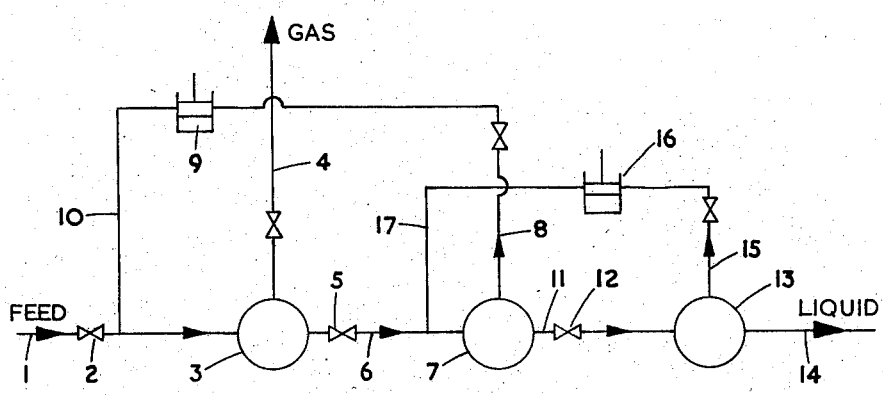
Figures 1 and 2 illustrate two methods of carrying out the process of the invention.

The preferred manner of operating a three-stage process according to the invention, namely, by rectifying recirculation, is illustrated in Figure 1. The fluid feed to be separated, for example a mixture of hydrocarbons, is passed through line 1 and through pressure let-down valve 2 into a high pressure or first stage separator 3. Separation of liquid and gas is allowed to occur in the separator 3, the gas being vented from the system through a valved line 4. Liquid from the first stage separator 3 passes through a pressure let-down valve 5 provided in a line 6 into an intermediate pressure or second stage separator 7.

Separation of liquid and gas is allowed to occur in the separator 7 and the gas released passes into valved line 8 to be recompressed by a compressor 9 to a pressure which is substantially that at which the first stage is operated. The recompressed gas from the compressor 9 is passed through a line 10 into the line 1 at a position between the valve 2 and the separator 3, the distance between the separator 3 and the junction of the lines 1 and 10 being of such a length as to permit the recompressed gas from line 10 substantially to attain equilibrium with the fluid mixture in line 1 before the mixture enters the separator 3.

Liquid from the separator 7 is passed through line 11 and let-down valve 12 into the low pressure or third stage separator 13 which may, for example, be maintained at atmospheric pressure. Gas and liquid are allowed to separate in the separator 13 from which the liquid is withdrawn from the system through line 14. The gas separated in the separator 13 passes into line 15 and is recompressed by a compressor 16 to the pressure at which the second stage is operated or to a slightly higher pressure, the recompressed gas being passed by the compressor 16 through line 17 into the fluid mixture in line 6. The line 6 between the junction of line 17 and the separator 7 is of sufficient length to permit the recompressed gas from the third stage separator 13 to attain substantial equilibrium with the fluid mixture in line 6, before the mixture enters the separator 7.

Figure 2:
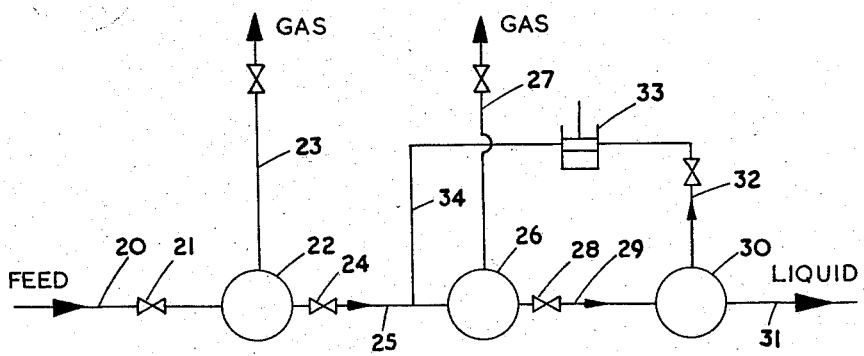

A further modification of the process according to the invention, as applied to a three-stage system, is illustrated in Figure 2, this modification being hereinafter identified as "last-stage recirculation." The gas/liquid mixture, for example a hydrocarbon mixture, constituting the feed is passed through line 20 and pressure let-down valve 21 into a high pressure or first stage separator 22. The gas released from the mixture in separator 22 is vented from the system through the valved line 23 whilst the liquid passes through the reducing valve 24 in line 25 into the intermediate pressure or second stage separator 26. Gas released from the fluid mixture in the separator 26 is vented through the valved line 27 whilst the pressure on the liquid is reduced further in its passage through a reducing valve 28 in line 29 to the low pressure separator 30. Liquid from the separator 30 passes out of the system through line 31, whilst gas released from the fluid mixture in separator 30 is withdrawn from the separator through line 32, recompressed by compressor 33 to substantially the pressure at which the second stage separator 26 is operated, and passed through line 34 into line 25 at a position to permit the gas to attain substantial equilibrium with the fluid mixture in line 25 before separation of gas and liquid is effected in the separator 26.

Figure 3:
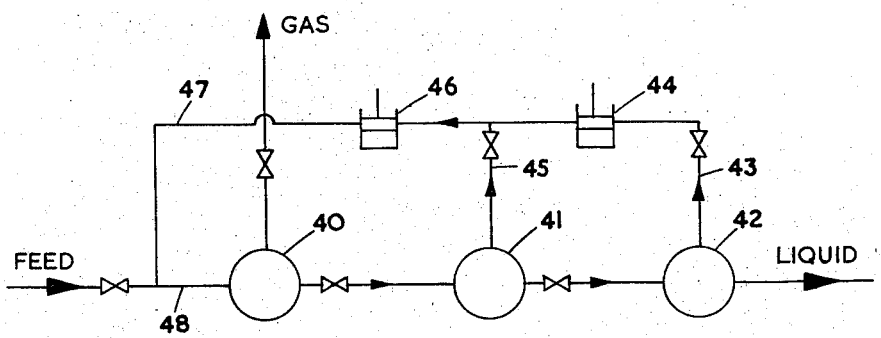
Figure 3 illustrates another method of separating a fluid mixture by a process herein identified as "integral recirculation"

In the method of liquid-gas separation illustrated in Figure 3, namely the method of integral recirculation, gas released in each of the pressure let-down stages after the first stage is recompressed and recycled into the fluid mixture prior to its entry into the first-stage separator. Thus gas separated in the low pressure separator 42 is withdrawn through line 43 and compressed to the intermediate pressure at which the second stage separator 41 is operated. This recompressed gas from the separator 42 is then further compressed, together with the gas separated in the separator 41 and withdrawn through line 45, in a compressor 46 to a pressure which is substantially that at which the first-stage separator 40 is operated. The recompressed gas from both of the separators 41 and 42 is then passed by the compressor 46 through line 47 into feed line 48, the recompressed gas and the feed to the system being brought into substantial equilibrium before the mixture enters the separator 40. It will be understood that the gas from separator 42 may be recompressed to the pressure existing in the first separator 40 independently of the gas from the second stage separator 41.

The compressors may be of any suitable form, for example, conventional gas-engine driven reciprocating machines or turbo-compressors, according to the size of the plant and the conditions. The turbo-compressor could, for example, be driven either by a gas combustion turbine or by an expansion turbine using the gas from one or more of the high pressure stages, if such gas is not required under pressure for other purposes.

It is common practice in the petroleum art to separate crude oil issuing from oil wells under pressure, into liquid and gas by releasing the pressure on the crude oil in a system using two or more pressure-reduction stages, the gas released in each of the stages being removed from the system. Two known examples of such systems employ three and seven stages of pressure reduction respectively and are hereinafter identified as the "three-stage no recirculation" and the "seven-stage no recirculation" systems respectively.

Each of the methods of separation identified as rectifying recirculation, last-stage recirculation, integral recirculation, three-stage no recirculation, and seven-stage no recirculation were used to separate a hydrocarbon mixture. A hydrocarbon mixture of precisely the same composition was used in each instance, the percentage molar composition of the hydrocarbon mixture being as follows:

| | Mols. |
|---|---|
| $C_1$ | 30.23 |
| $C_2$ | 8.11 |
| $C_3$ | 7.45 |
| $i\text{-}C_4$ | 1.44 |
| $n\text{-}C_4$ | 4.42 |
| $i\text{-}C_5$ | 1.99 |
| $n\text{-}C_5$ | 2.59 |
| $C_6$ | 4.27 |
| $C_7+$ | 39.50 |
| | 100.00 |

The methods of rectifying recirculation, last-stage recirculation and integral recirculation were each used with three stages, as described with reference to Figures 1 to 3. The pressures used in the several stages and results obtained are given in the following Tables 1 to 5 and the results are shown in graphical form in Figures 4 and 5. In the tables, the compositions of the gas and liquid stream from each stage is expressed in mols. per 100 mols of hydrocarbon mixture fed into the system.

TABLE 1

*Rectifying recirculation (3-stage)*

| Stage | 1st | | 2nd | | 3rd | | Liquid Phase Product, Percent Recovery of Feed Components |
|---|---|---|---|---|---|---|---|
| Pressure, p.s.i. abs | 315 | | 80 | | 14.7 | | |
| | Gas Mols | Liquid Mols | Gas Mols | Liquid Mols | Gas Mols | Liquid Mols | |
| $C_1$ | 30.23 | 6.27 | 6.27 | 0.52 | 0.52 | 0.00 | |
| $C_2$ | 7.92 | 7.20 | 7.01 | 3.31 | 3.12 | 0.19 | 2.3 |
| $C_3$ | 5.07 | 12.53 | 10.15 | 14.47 | 12.09 | 2.38 | 32 |
| $i\text{-}C_4$ | 0.42 | 2.03 | 1.01 | 3.29 | 2.27 | 1.02 | 71 |
| $n\text{-}C_4$ | 0.86 | 5.78 | 2.22 | 9.47 | 5.91 | 3.56 | 81 |
| $i\text{-}C_5$ | 0.14 | 2.15 | 0.30 | 3.11 | 1.26 | 1.85 | 93 |
| $n\text{-}C_5$ | 0.14 | 2.73 | 0.28 | 3.76 | 1.30 | 2.45 | 95 |
| $C_6$ | 0.08 | 4.30 | 0.11 | 4.95 | 0.76 | 4.19 | 98 |
| $C_7+$ | 0.03 | 39.50 | 0.03 | 39.61 | 0.14 | 39.47 | ~100 |
| | 44.89 | 82.49 | 27.38 | 82.49 | 27.37 | 55.11 | |

TABLE 2

*Last-stage recirculation (3-stage)*

| Stage | 1st | | 2nd | | 3rd | | Liquid Phase Product, Percent Recovery of Feed Components |
|---|---|---|---|---|---|---|---|
| Pressure, p.s.i. abs | 315 | | 80 | | 14.7 | | |
| | Gas Mols | Liquid Mols | Gas Mols | Liquid Mols | Gas Mols | Liquid Mols | |
| $C_1$ | 24.12 | 6.11 | 6.10 | 0.72 | 0.71 | 0.01 | 0.03 |
| $C_2$ | 3.83 | 4.28 | 3.98 | 2.76 | 2.46 | 0.30 | 3.7 |
| $C_3$ | 1.84 | 5.61 | 3.57 | 7.45 | 5.42 | 2.04 | 27.4 |
| $i\text{-}C_4$ | 0.20 | 1.24 | 0.38 | 1.85 | 0.99 | 0.86 | 60 |
| $n\text{-}C_4$ | 0.48 | 3.94 | 0.89 | 5.70 | 2.65 | 3.05 | 69 |
| $i\text{-}C_5$ | 0.10 | 1.89 | 0.16 | 2.34 | 0.61 | 1.73 | 87 |
| $n\text{-}C_5$ | 0.10 | 2.49 | 0.15 | 2.99 | 0.65 | 2.34 | 90 |
| $C_6$ | 0.06 | 4.21 | 0.08 | 4.52 | 0.39 | 4.13 | 97 |
| $C_7+$ | 0.01 | 39.49 | 0.19 | 39.37 | 0.07 | 39.30 | ~100 |
| | 30.74 | 69.26 | 15.50 | 67.70 | 13.95 | 53.76 | |

TABLE 3

*Integral recirculation (3-stage)*

| Stage | 1st | | 2nd | | 3rd | | Liquid Phase Product, Percent Recovery of Feed Components |
|---|---|---|---|---|---|---|---|
| Pressure, p.s.i. abs | 290 | | 80 | | 14.7 | | |
| | Gas Mols | Liquid Mols | Gas Mols | Liquid Mols | Gas Mols | Liquid Mols | |
| $C_1$ | 30.22 | 5.34 | 4.70 | 0.64 | 0.63 | 0.01 | 0.03 |
| $C_2$ | 7.81 | 5.51 | 3.10 | 2.41 | 2.11 | 0.30 | 3.7 |
| $C_3$ | 5.29 | 10.12 | 3.06 | 7.06 | 4.90 | 2.16 | 29 |
| $i\text{-}C_4$ | 0.54 | 2.14 | 0.35 | 1.79 | 0.89 | 0.90 | 62 |
| $n\text{-}C_4$ | 1.22 | 6.29 | 0.78 | 5.51 | 2.31 | 3.20 | 72 |
| $i\text{-}C_5$ | 0.21 | 2.44 | 0.13 | 2.31 | 0.53 | 1.78 | 89 |
| $n\text{-}C_5$ | 0.21 | 3.08 | 0.14 | 2.94 | 0.56 | 2.38 | 92 |
| $C_6$ | 0.13 | 4.54 | 0.07 | 4.47 | 0.33 | 4.14 | 97 |
| $C_7+$ | | 39.57 | 0.01 | 39.56 | 0.06 | 39.50 | 100 |
| | 45.63 | 79.03 | 12.34 | 66.69 | 12.32 | 54.37 | |

TABLE 4

*3 stage no recirculation*

| Stage | 1st | | 2nd | | 3rd | | Liquid Phase Product, Percent Recovery of Feed Components |
|---|---|---|---|---|---|---|---|
| Pressure, p.s.i. abs | 315 | | 80 | | 14.7 | | |
| | Gas Mols | Liquid Mols | Gas Mols | Liquid Mols | Gas Mols | Liquid Mols | |
| $C_1$ | 24.12 | 6.11 | 5.22 | 0.89 | 0.86 | 0.03 | 0.1 |
| $C_2$ | 3.83 | 4.28 | 2.17 | 2.11 | 1.73 | 0.38 | 4.7 |
| $C_3$ | 1.84 | 5.61 | 1.43 | 4.18 | 2.50 | 1.68 | 22.6 |
| $i\text{-}C_4$ | 0.20 | 1.24 | 0.16 | 1.08 | 0.42 | 0.66 | 46 |
| $n\text{-}C_4$ | 0.48 | 3.94 | 0.40 | 3.54 | 1.16 | 2.38 | 54 |
| $i\text{-}C_5$ | 0.10 | 1.89 | 0.09 | 1.80 | 0.29 | 1.51 | 76 |
| $n\text{-}C_5$ | 0.10 | 2.49 | 0.09 | 2.40 | 0.32 | 2.08 | 80 |
| $C_6$ | 0.06 | 4.21 | 0.05 | 4.16 | 0.21 | 3.95 | 92 |
| $C_7+$ | 0.01 | 39.49 | 0.01 | 39.48 | 0.04 | 39.44 | ~100 |
| | 30.74 | 69.26 | 9.62 | 59.64 | 7.53 | 52.11 | |

TABLE 5

*7 stage no recirculation*

| Stage | 1st | | 2nd | | 3rd | | 4th | | 5th | | 6th | | 7th | | Liquid Phase Product, Percent Recovery of Feed Components |
|---|---|---|---|---|---|---|---|---|---|---|---|---|---|---|---|
| Pressure, p.s.i. abs | 315 | | 190 | | 140 | | 75 | | 45 | | 25 | | 15 | | |
| | Gas Mols | Liquid Mols | Gas Mols | Liquid Mols | Gas Mols | Liquid Mols | Gas Mols | Liquid Mols | Gas Mols | Liquid Mols | Gas Mols | Liquid Mols | Gas Mols | Liquid Mols | |
| $C_1$ | 24.12 | 6.11 | 2.77 | 3.34 | 1.26 | 2.08 | 1.35 | 0.73 | 0.49 | 0.24 | 0.21 | 0.03 | 0.03 | 0.00 | |
| $C_2$ | 3.83 | 4.28 | 0.62 | 3.66 | 0.39 | 3.27 | 0.83 | 2.44 | 0.65 | 1.79 | 0.92 | 0.87 | 0.51 | 0.36 | 4.45 |
| $C_3$ | 1.84 | 5.61 | 0.31 | 5.30 | 0.21 | 5.09 | 0.48 | 4.61 | 0.45 | 4.15 | 1.01 | 3.14 | 0.98 | 2.16 | 29 |
| $i\text{-}C_4$ | 0.20 | 1.24 | 0.02 | 1.22 | 0.02 | 1.20 | 0.05 | 1.15 | 0.05 | 1.10 | 0.13 | 0.97 | 0.16 | 0.81 | 56 |
| $n\text{-}C_4$ | 0.48 | 3.94 | 0.08 | 3.86 | 0.05 | 3.81 | 0.13 | 3.68 | 0.12 | 3.56 | 0.33 | 3.23 | 0.41 | 2.82 | 64 |
| $i\text{-}C_5$ | 0.10 | 1.89 | 0.01 | 1.88 | 0.01 | 1.87 | 0.03 | 1.84 | 0.03 | 1.81 | 0.07 | 1.74 | 0.09 | 1.65 | 83 |
| $n\text{-}C_5$ | 0.10 | 2.49 | 0.01 | 2.48 | 0.01 | 2.47 | 0.03 | 2.44 | 0.03 | 2.41 | 0.08 | 2.33 | 0.10 | 2.23 | 86 |
| $C_6$ | 0.06 | 4.21 | 0.01 | 4.20 | 0.01 | 4.19 | 0.02 | 4.17 | 0.02 | 4.15 | 0.04 | 4.11 | 0.06 | 4.05 | 95 |
| $C_7+$ | 0.01 | 39.49 | 0.00 | 39.49 | 0.00 | 39.49 | 0.00 | 39.49 | 0.00 | 39.49 | 0.00 | 39.49 | 0.01 | 39.48 | ~100 |
| | 30.74 | 69.26 | 3.83 | 65.43 | 1.96 | 63.47 | 2.92 | 60.55 | 1.85 | 58.70 | 2.79 | 55.91 | 2.35 | 53.56 | |

It will be understood that the invention is not limited to the use of any particular form of apparatus. The essential requirements of the apparatus for carrying out the process of the invention are: means for reducing the pressure on the fluid mixture in steps, means for separating the gases released and means for recycling the gas in accordance with the invention.

The application of the invention, with the use of only three stages, to the separation of hydrocarbon gases from rich crude oil permits the butanes to be recovered to the extent of 70–80% and the pentanes to be recovered to the extent of 93–95%, thus attaining or approaching at very much less cost the overall recovery which may be obtained by the use of a relatively inexpensive absorption plant.

I claim:

1. A process for the separation of component fractions from a fluid mixture of petroleum hydrocarbons having a liquid phase which comprises reducing the pressure on the fluid mixture of petroleum hydrocarbon in at least three separate stages to yield a gaseous phase and a liquid phase in each stage, separating the gaseous phase from the liquid phase in each stage, withdrawing the gaseous phase separated in the first stage, compressing the gaseous phase from each stage after the first stage and recycling the compressed gaseous phase to bring it into substantially equilibrium with the liquid phase of the fluid mixture prior to entry of the fluid mixture into a stage preceding the stage from which the compressed gaseous phase is withdrawn, said gaseous phase constituting the sole recycle medium.

2. A process for the separation of component fractions from a fluid mixture of petroleum hydrocarbons having a liquid phase which comprises reducing the pressure on the fluid mixture of petroleum hydrocarbon in at least three separate stages to yield a gaseous phase and a liquid phase in each stage, separating the gaseous phase from the liquid phase in each stage, withdrawing the gaseous phase separated in the first stage, compressing the gaseous phase from each of the remaining stages and recycling each compressed gaseous phase to and bringing it into substantial equilibrium with the liquid phase prior to entry of the liquid phase into the stage immediately preceding the stage in which the gaseous phase is withdrawn, said gaseous phases constituting the sole recycle medium to each liquid phase.

3. A process in accordance with claim 1 in which the pressure is decreased in three stages, the gaseous phase separated in each of the second and third stages being compressed and recycled to the liquid phases prior to entry into the first and second stages, respectively.

References Cited in the file of this patent

UNITED STATES PATENTS

| | | | |
|---|---|---|---|
| 2,183,604 | Barton et al. | Dec. 19, | 1939 |
| 2,184,596 | Hutchinson | Dec. 26, | 1939 |
| 2,222,275 | Babcock | Nov. 19, | 1940 |
| 2,250,716 | Legatski | July 29, | 1941 |
| 2,250,925 | Babcock | July 29, | 1941 |
| 2,277,387 | Carney | Mar. 24, | 1942 |
| 2,303,609 | Carney | Dec. 1, | 1942 |
| 2,428,521 | Latchum | Oct. 7, | 1947 |
| 2,673,829 | King | Mar. 30, | 1954 |